United States Patent [19]

Castro

[11] Patent Number: 4,842,092
[45] Date of Patent: Jun. 27, 1989

[54] VEHICLE ANTI-THEFT DEVICE
[75] Inventor: Felix Castro, West Palm Beach, Fla.
[73] Assignee: Fuelock, Inc., West Palm Beach, Fla.
[21] Appl. No.: 81,888
[22] Filed: Aug. 4, 1987
[51] Int. Cl.[4] .................................. B60R 25/00
[52] U.S. Cl. ............................ 180/287; 70/163; 70/174
[58] Field of Search .............. 180/287; 70/163, 174, 70/177, 179

[56] References Cited

U.S. PATENT DOCUMENTS

| | | | |
|---|---|---|---|
| 1,067,549 | 7/1913 | Quigley | 70/177 |
| 1,506,493 | 8/1924 | Levison | 70/242 |
| 2,057,109 | 10/1936 | Parker | 70/244 |
| 2,103,937 | 12/1937 | Driscoll | 70/177 |
| 2,881,789 | 4/1959 | Finazzo | 137/354 |
| 2,913,894 | 11/1959 | Gieray et al. | 70/237 |
| 3,682,267 | 8/1972 | Kayser | 180/287 |
| 3,773,139 | 11/1973 | Landi | 180/287 |
| 3,782,862 | 1/1974 | Cammi | 324/65 R |
| 3,919,868 | 11/1975 | Lipschutz | 70/239 |
| 4,084,657 | 4/1978 | Bradley et al. | 180/287 |
| 4,353,336 | 10/1982 | Mowbray | 123/198 B |
| 4,377,178 | 3/1983 | Thompson | 70/177 |
| 4,422,314 | 12/1983 | Cooper | 70/242 |
| 4,458,510 | 7/1984 | Nielsen | 70/177 |
| 4,522,569 | 6/1985 | Taylor | 417/434 |

FOREIGN PATENT DOCUMENTS 1901368  9/1970  Fed. Rep. of Germany ...... 180/287

OTHER PUBLICATIONS

Manual Parts 936 Wheel Loader, Caterpillar Tractor Co.
Manual-3304 Vehicular Engine for 936 Wheel Loader, Caterpillar Tractor Co.
Manual-3306 Vehicular Engine, Caterpillar Tractor Co.

Primary Examiner—Kenneth R. Rice
Attorney, Agent, or Firm—Steele, Gould & Fried

[57] ABSTRACT

An anti-theft device is provided for vehicles and particularly for those vehicles powered by an engine with an external governor linkage lever. The device includes structure for engaging the external governor linkage lever of the engine. Structure is also provided for engaging a portion of the vehicle that is fixed to the operation of the governor linkage lever. Locking structure is provided for disengagably locking the structure for engaging the governor linkage lever to the structure for engaging a fixed portion of the engine.

21 Claims, 4 Drawing Sheets

VEHICLE ANTI-THEFT DEVICE

BACKGROUND OF THE INVENTION

1. Field of the Invention

This invention relates to vehicle anti-theft devices, and particularly to vehicle anti-theft locks.

2. Description of the Prior Art

Vehicle theft is a continuing problem but is of the utmost concern to the owners of heavy equipment such as bulldozers, graders, loaders, tractors, and other machinery using diesel engines as a power source. Heavy equipment is difficult to transport back to the equipment yard on a daily basis and, therefore, is usually left on the jobsite unattended.

Past attempts to offer an anti-theft device for heavy equipment have been limited to either interruption of the electrical system or to cutting off fuel flow in the fuel system. Both methods can be overcome by thieves, who often are skillful at bypassing the cutoff device. Additionally, because thieves often have direct access to the cutoff device, they sometimes are able to disarm the cutoff device itself so that bypassing the device is not necessary.

SUMMARY OF THE INVENTION

It is an object of the invention to provide an anti-theft device which cannot be easily bypassed.

It is another object of the invention to provide an anti-theft device which cannot be easily disarmed.

It is still another object of the invention to provide an anti-theft device which will have no effect on the normal operation of the vehicle.

It is yet another object of the invention to provide an anti-theft device which is easily installed.

These and other objects are accomplished by an anti-theft device for a vehicle powered by an engine with an external governor linkage lever. The device includes means for engaging the external governor linkage lever of the engine and means for engaging a portion of the vehicle that is fixed relative to the operation of the governor linkage lever. Locking means is provided for disengagably locking the means for engaging the governor linkage lever to the means for engaging a fixed portion of the vehicle. The governor linkage lever is thereby operatively fixed to a portion of the vehicle such that it cannot pivot in its normal fashion and the engine cannot be operated.

The structure for engaging a fixed portion of the vehicle preferably comprises a lock housing adapted to nest snugly with a fixed portion of the engine so as to prevent pivoting of the locking means, the means for engaging the governor linkage lever, and thus the governor linkage lever itself.

The means for engaging the governor linkage lever preferably comprises a locking member fixable to the governor linkage lever and having structure for engaging the locking means, which preferably is an aperture at an end of the locking member substantially opposite the governor linkage lever. The locking means preferably includes a lock assembly fixed to the lock housing. An aperture is preferably provided in the lock housing to permit passage of the locking member through the housing where it can be engaged to the lock assembly. A movable portion of the lock assembly preferably engaged the aperture in the locking member to secure the locking member and thus the governor linkage lever in place. An example of a suitable lock is that made by the American Lock Company of Crete, Ill. and manufactured pursuant to U.S. Pat. No. 3,769,821, the disclosure of which is hereby fully incorporated by reference.

The locking member can be a locking pin which preferably is received by a bore formed in the governor linkage lever. The locking pin may be secured within the bore by set screws or other fastening structure. The locking member may alternatively be a locking arm that is fixed to an exterior surface of the governor linkage lever by fastening means.

The lock housing is preferably adapted to engage the governor housing of the engine. The lock housing nests snugly with the governor housing to prevent rotation of the lock housing, lock assembly, locking member, and governor linkage lever. A stop or other structure can be added to the governor housing or engine block is necessary to provide a surface on which to fit the locking housing.

The lock housing preferably at least partially cover the governor housing such that cover screws which must be removed to disassemble the governor housing cannot be reached when the lock housing is locked in place. The lock housing, being secured to the governor linkage lever, cannot be removed. The device resists tampering by guarding access to the governor housing with hands or tools.

Thieves encountering a locking device according to the invention may attempt to override the device by forcing the operator's governor pedal or the shaft leading to the governor linkage lever. It is therefore desirable to provide a break-away attachment of the shaft to the governor linkage lever which will give way under excessive force and prevent damage to the governor linkage lever or the governor itself. This can be accomplished by securing the shaft connecting the foot pedal to the governor linkage lever by a shear bolt which is preferably made of relatively soft metal and which can have a bore through at least a portion of its longitudinal axis. Should a thief try to force the governor pedal against the locking device of the invention, the bolt will shear in half and prevent damage to the linkage and to the governor.

The inventive device is useful for virtually any engine having an external governor linkage lever. The invention is particularly well suited for many diesel engines including those found on heavy equipment such as bulldozers, graders, loaders, tractors and heavy machinery.

The invention is preferably constructed of materials which will resist tampering by thieves. A good quality stainless steel or the like is a preferable material to ward off persistent thieves. It is sometimes desirable to encase the lock assembly in a casing of stainless steel or another material which will withstand severe blows or other types of tampering.

BRIEF DESCRIPTION OF THE DRAWINGS

There are shown in the drawings embodiments which are presently preferred, it being understood, however, that the invention is not limited to the precise instrumentalities and arrangements shown, wherein.

DETAILED DESCRIPTION OF THE PREFERRED EMBODIMENTS

Figure 1:
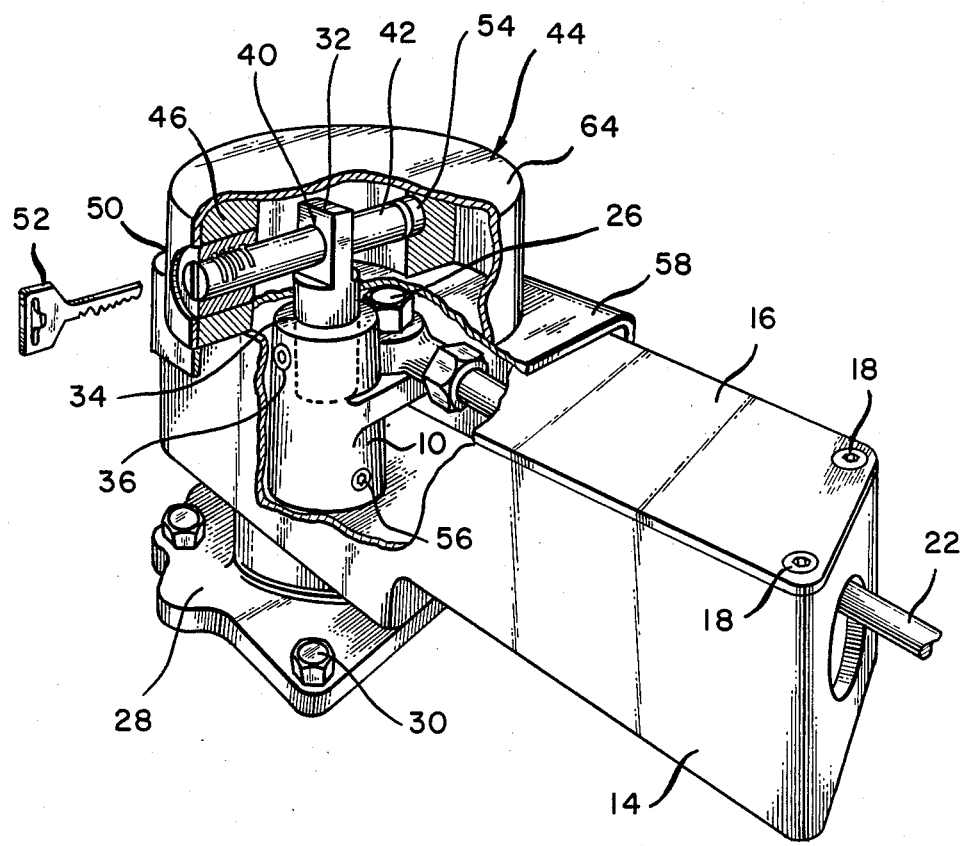
FIG. 1 is a perspective, partially broken away, of a vehicle anti-theft device according to the invention.
Figure 2:
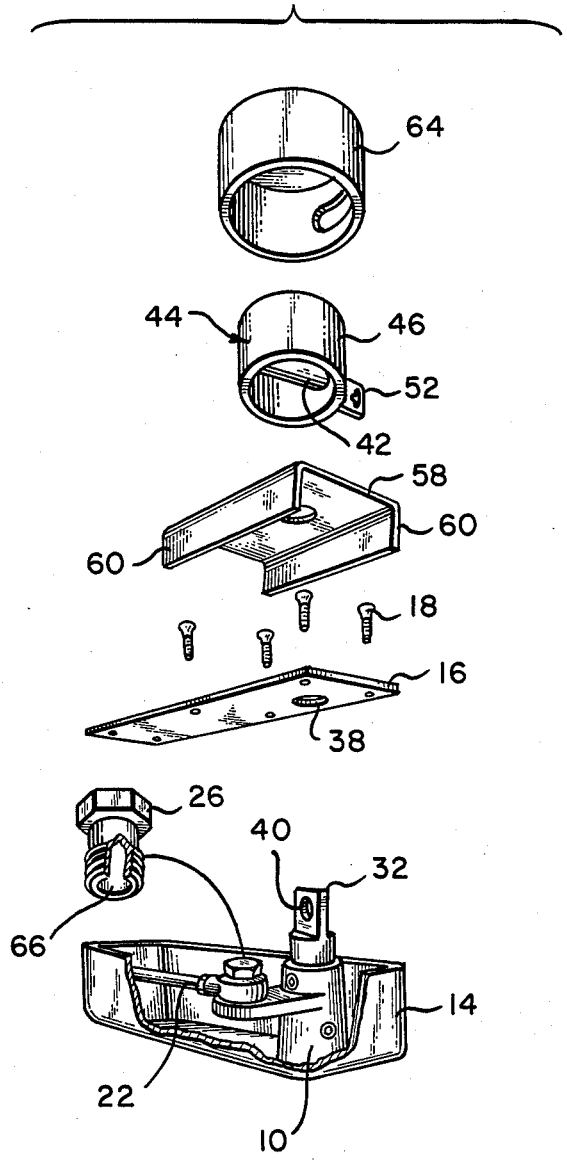
FIG. 2 is an exploded perspective, partially broken away.

Referring to FIGS. 1-2, there is shown a vehicle anti-theft device according to the invention and engaged to a governor linkage lever 10. The governor linkage lever 10 is mounted within a governor lever housing 14 which has a cover 16 secured to it by suitable fastening structure such as screws 18. A control shaft 22 is pivotally connected to the governor linkage lever 10 by a bolt 26.

The control shaft 22 is manipulated by a foot pedal or throttle control to actuate the governor linkage lever 10. The governor linkage lever 10 is operatively connected to the governor of the engine to control the speed at which the engine operates. The governor control mechanism shown in FIGS. 1-2 is similar to that found on the Model No. 936 wheel loader of the Caterpillar Tractor Company of Peoria, Ill., which is powered by the Model No. 3304 engine. The governor housing 14 is mounted by a base plate 28 to the block of an engine by bolts 30.

According to the invention, structure is provided for engaging the external governor linkage lever 10. This structure can be the locking pin 32. The locking pin 32 is adapted to engage the external governor linkage lever 10. The locking pin 32 can be received in a bore 34 (phantom lines) formed in the governor linkage lever 10. A set screw 36 is used to secure the locking pin 32 in place. The locking pin 32 extends through an aperture 38 in the governor cover 16. The locking pin 32 has an aperture 40 at an end substantially opposite the governor linkage lever 10. The aperture 40 is adapted to receive a clasp portion 42 of a lock assembly 44. The lock assembly 44 may be a Series 2000 lock of the American Lock Company of Crete, Ill. This lock is manufactured pursuant to U.S. Pat. No. 3,769,821. The clasp portion 42 is slidably mounted within an annular lock body 46. A lock 50 can be manipulated by the key 52 to rotate the clasp portion 42. A latch portion 54 of the clasp portion 42 is thereby released from the annular lock body 46. The clasp portion 42 can then be withdrawn along its longitudinal axis to remove it from within the aperture 40 in the locking pin 32.

The governor linkage lever 10 is normally pressed onto the shaft which connects it to the governor and is longitudinally slidable with respect thereto, being retained on that shaft by the governor housing cover 16. The amount of longitudinal play is small, but is sufficient to prevent alignment of the clasp portion 42 with the aperture 40. It is therefore desirable to secure the governor linkage lever 10 to the shaft connecting it to the governor by suitable fastening means such as the set screw 56. The set screw 56 will insure that the aperture 40 will align with the clasp portion 42.

The lock assembly 44 is secured to structure for engaging a portion of the vehicle that is fixed relative to the operation of the governor linkage lever 10, such as the governor housing 14. Suitable structure can be a lock housing 58 that is adapted to fit over the governor housing 14 and governor housing cover 16. The lock housing 58 can have depending flanges 60 which are adapted to nest snugly over the governor housing 14 and the governor housing cover 16. The lock housing 58 and flanges 60 prevent the lock assembly 44 from rotating with respect to its mounting on the governor housing 14. The locking pin 32, when engaged by the clasp portion 42 of the lock assembly 44, is then prevented from similr rotation, and the governor linkage lever 10 cannot pivot in its usual fashion. The governor is operatively locked in place and the engine will not run until the lock has been removed.

The lock housing 58 provides an added measure of protection in that it covers the governor housing cover screws 18 so that the governor housing cover 16 cannot be removed and the lock cannot be bypassed. The lock assembly 44 and the lock housing 58 cannot be removed from their position over the cover screws 18 since the former are secured to the locking pin 32.

The device according to the invention can be made from many materials, but high strength materials are preferred to resist tampering. A stainless steel casing 64 can be provided to surround the annular lock body 46 for added protection from breakage and tampering.

A theif may attempt to force the governor control pedal against the locking device of the invention in order to run the vehicle. In doing so, the control shaft 22 or other components could be damaged. It is therefore desirable to construct the bolt 26 as a shear bolt. The shear bolt is constructed such that excessive force on the control shaft 22 will cause the shear bolt 26 to shear apart so that the control 22 will not be damaged. The shear bolt 26 can have a bore 66 at least partially through its longitudinal axis to reduce the shear strength of the bolt 26. The bolt 26 will give way before damage is done to the control shaft 22 or other components. It is also possible to form the bolt 26 from relatively soft metal to reduce the shear strength of the bolt 26.

Figure 3:
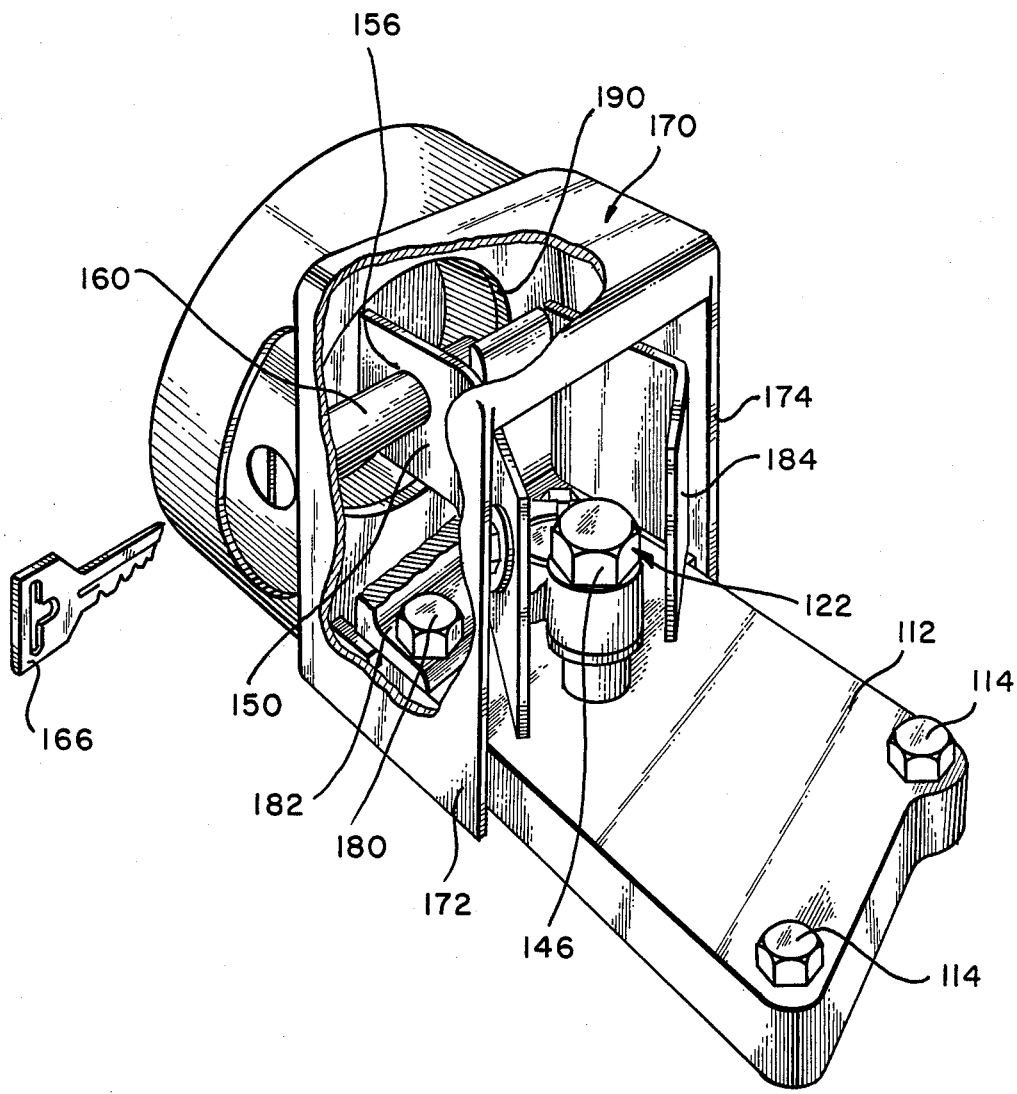
FIG. 3 is a perspective, partially broken away, of an alternative embodiment of the invention.
Figure 4:
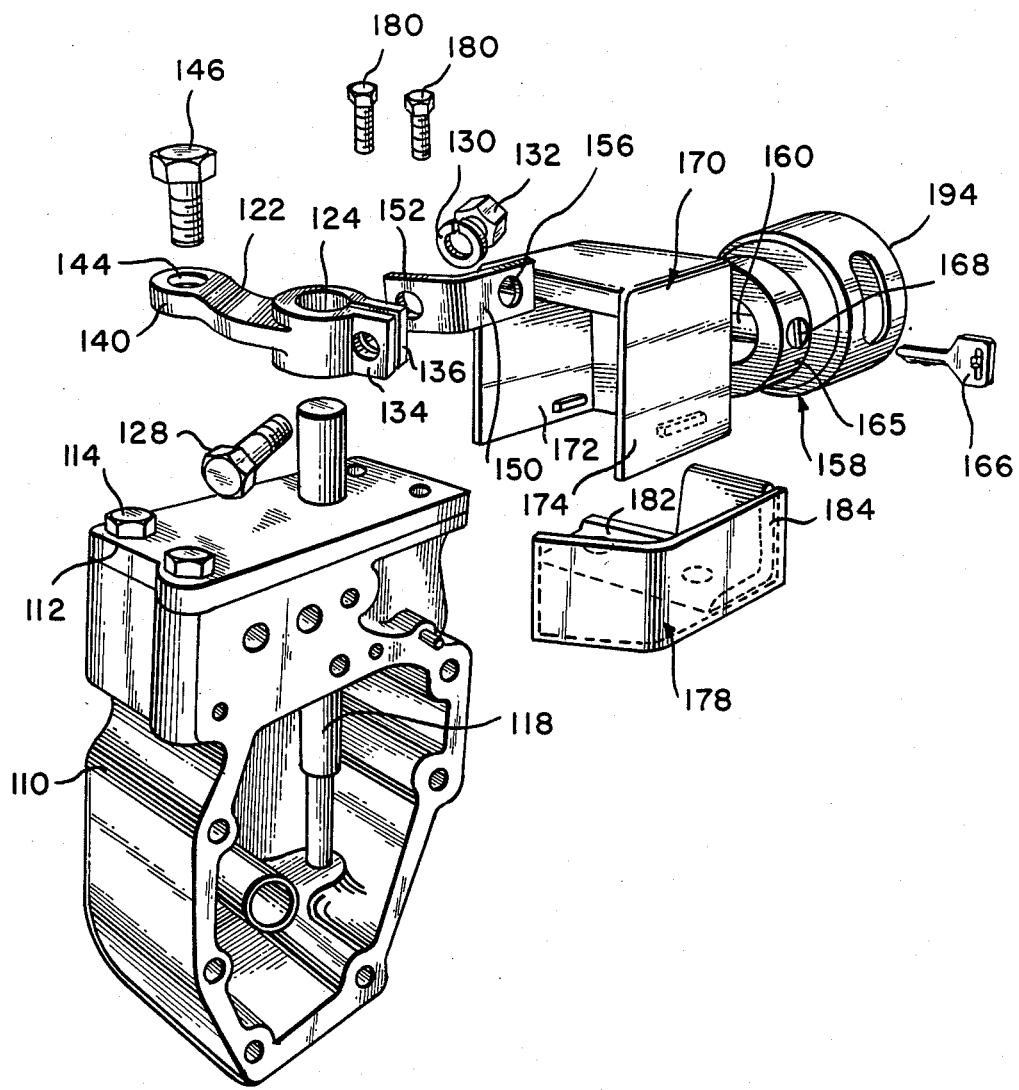
FIG. 4 is an exploded perspective, partially in phantom.

The invention is generally suitable for use with any engine that has an external governor linkage lever. It may be necessary to accomodate particular characteristics of the governor and engine design. An alternative embodiment of the invention, for example, is shown in Figs. 3-4. A governor housing 110 has a governor housing cover 112. The governor housing cover 112 is secured to the governor housing 110 by bolts 114. A governor shaft 118 extends from the interior of the governor housing 110, through an aperture in the governor housing cover 112, to a governor linkage lever 122. An aperture 124 in the governor linkage lever 122 is adapted to encircle the governor shaft 118. The aperture 124 can be tightened through a bolt 128, washer 130 and nut 132, which pull legs 134, 136 of the governor linkage lever 122 toward one another and about the governor shaft 118. An arm 140 of the governor linkage lever 122 includes an aperture 144 which is adapted to receive a linkage member such as a bolt 146 or the like to operatively connect the governor shaft 118 to a control shaft and thus to a foot pedal or a throttle.

A locking arm 150 is provided to engage an external surface of the governor linkage lever 122. The locking arm 150 has an aperture 152 at one end to engage the bolt 128 to secure the locking arm to the governor linkage lever 122. An aperture 156 is provided substantially at an opposite end of the locking arm 150 from the aperture 152. The aperture 156 is adapted to receive a portion of a lock assembly 164 to secure the lock assembly 158 in place.

The lock assembly 158 can be that as previously described and thus comprise a clasp portion 160 adapted to engage the aperture 156 in the locking arm 150. The clasp portion 160 is slidably mounted within the annular lock body 165. A key 166 is operably to rotate a lock portion 168 to also rotate the clasp portion 160. Rotation of the clasp portion 160 unlatches sliding movement of the clasp portion so as to remove it from engagement with the locking arm 150.

The lock assembly 158 is fixed to structure for engaging a portion of the vehicle that is fixed relative to the operation of the governor linkage lever 122 such as the governor housing 110. This structure preferably is a box-like lock housing 170 adapted to fit over the governor linkage lever 122 and the locking arm 150. Sides 172, 174 of the lock housing 170 are adapted to engage sides of the governor housing cover 112. A stop portion 178 is preferably provided to present an additional surface for engagement to the lock housing 170. The stop portion 178 is fixed to the governor housing cover 112 through the screws 180. The stop portion 178 includes a base portion 182 and an upstanding flange portion 184. The upstanding portion 184 provides a seat for the locking housing 170 and gives overall strength and stability to the lock.

The lock housing 170 includes an aperture 190 which permits passage of the end of the locking arm 150 bearing the aperture 156. The aperture 156 aligns within the annular lock body 165 so as to receive the clasp portion 160, to firmly lock the locking arm 150 in place. In this manner, the governor linkage lever 122 is locked in place and the governor shaft 118 cannot pivot. The engine will not operate until the device has been unlocked and removed. The lock housing 170 covers the governor linkage lever 122 and thus resists tampering and bypassing of the device.

A casing 194 of stainless steel or other high strength material can be used to protect the lock body 165 to give an added measure of security to the device. Additionally, the bolt 46 can be made as a shear bolt, as previously described, to prevent damage to the governor and governor linkage.

The invention is suited for use on virtually any engine with an external governor linkage lever. The invention is particularly well suited for diesel engines with an external governor linkage lever. The invention engine with which it is used, and therefore reference should be made to the following claims, rather than to the foregoing specification, as indicating the scope of the invention.

I claim:

1. An anti-theft device for vehicles and equipment powered by engines having a governor mechanism with an external governor linkage lever, comprising:
    means separate to the governor mechanism for engaging the external governor linkage lever;
    means for engaging a portion of the vehicle or equipment that is fixed relative to the operation of the governor linkage lever; and
    locking means for disengagably locking said means for engaging the governor linkage lever to the means for engaging a fixed portion of the vehicle or equipment, whereby movement of the governor linkage lever necessary for operation of the engine is prevented.

2. The anti-theft device of claim 1, wherein the fixed portion of the vehicle or equipment is a portion of the engine.

3. The anti-theft device of claim 2, wherein the means for engaging the governor linkage lever comprises a locking member fixable to the governor linkage lever and having structure for engaging the locking means.

4. The anti-theft device of claim 3, wherein the locking means comprises a lock assembly fixed to a lock housing, the lock housing being adapted to nest snugly with the fixed portion of the engine, an aperture in the lock housing permitting passage of an end of the locking member through the lock housing.

5. The anti-theft device of claim 4, wherein the lock assembly comprises a clasp portion adapted to engage an aperture in the locking member.

6. The anti-theft device of claim 5, wherein the lock assembly is constructed with an annular lock body, and a clasp portion is slidably and detachably mounted within the lock body.

7. The anti-theft device of claim 5, wherein the locking member is a locking pin fixed to the governor linkage lever, the aperture being positioned substantially near the end of the locking pin opposite the governor linkage lever.

8. The anti-theft device of claim 7, wherein the locking pin is received by a bore in the governor linkage lever and held in place by fastening means.

9. The anti-theft device of claim 8, wherein the fastening means comprises set screws.

10. The anti-theft device of claim 5, wherein the locking member comprises a locking arm fixed to an external surface of the governor linkage lever and the aperture is positioned substantially near the end of the locking arm that is opposite the governor linkage lever.

11. The anti-theft device of claim 5, further comprising a stop secured to the fixed portion of engine and adapted to nest snugly with the lock housing to prevent rotation of the lock housing, whereby pivoting of the linkage lever in its usual fashion is also prevented.

12. The anti-theft device of claim 5, wherein the fixed portion of the engine comprises the governor housing.

13. The anti-theft device of claim 12, wherein the lock housing at least partially covers the governor linkage lever and the governor housing, whereby access to the governor housing and the governor linkage lever is impaired and tampering is prevented.

14. The anti-theft device of claim 5, further comprising a control means connected to the governor linkage lever by break-away fastening means.

15. The anti-theft device of claim 14, wherein the break-away fastening means comprises a shear bolt having a bore through at least a portion of its longitudinal access.

16. The anti-theft device of claim 6, wherein the lock housing assembly is encased in a stainless steel casing.

17. A method for preventing the theft of vehicles and equipment having governor control linkages external to the engine, comprising the steps of:
    securing a portion of said external governor control linkage to a portion of said vehicle or equipment that is fixed relative to the operational motion of said portion of said external governor control linkage by lock means, whereby movement of the portion of said external governor control linkage is prevented and said engine cannot be operated; and,
    disengaging said lock means whenever operation of said engine is desired.

18. An anti-theft device for vehicles and equipment powered by engines having a governor mechanism with a governor linkage lever, comprising:
    means for engaging the governor linkage lever;
    means for engaging a portion of the vehicle or equipment that is fixed relative to the operation of the governor linkage lever; and, locking means for disengagably locking said means for engaging the governor linkage lever to the means for engaging a fixed portion of the vehicle or equipment, whereby movement of the governor linkage lever necessary for operation of the engine is prevented.

19. The anti-theft device of claim 18, wherein the locking means comprises a housing adapted to fit over said governor linkage lever so as to substantially prevent access to said governor linkage lever.

20. The anti-theft device of claim 19, wherein the means for engaging the governor linkage lever comprises a locking member attachable to the governor linkage lever, and the locking means comprises a lock assembly fixed to a lock housing, an aperture in the lock housing permitting passage of an end of the locking member through the lock housing to the lock assembly.

21. The anti-theft device of claim 20, wherein the fixed portion of the vehicle or equipment is a portion of the engine.

* * * * *

UNITED STATES PATENT AND TRADEMARK OFFICE
CERTIFICATE OF CORRECTION

PATENT NO. : 4,842,092

DATED : June 27, 1989

INVENTOR(S) : Felix Castro

It is certified that error appears in the above-identified patent and that said Letters Patent is hereby corrected as shown below:

Column 2, line 17, delete "locking" and insert --lock--.

Column 4, line 19, delete "theif" and insert --thief--.

Column 4, line 26, after "control" insert --shaft--.

Column 4, line 68, delete "operably" and insert --operable--.

Column 5, line 36, delete "46" and insert --146--.

Column 5, line 42, after "invention" insert --can be adapted in many forms and embodiments depending on the particular --.

Signed and Sealed this

Nineteenth Day of June, 1990

*Attest:*

HARRY F. MANBECK, JR.

*Attesting Officer*     *Commissioner of Patents and Trademarks*